Oct. 26, 1965   J. KARPINSKÝ   3,214,692
METHOD OF AND DEVICE FOR MEASURING SMALL ALTERNATING SIGNALS
Filed Jan. 6, 1961
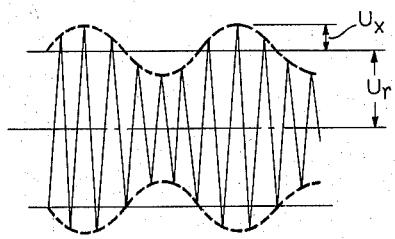
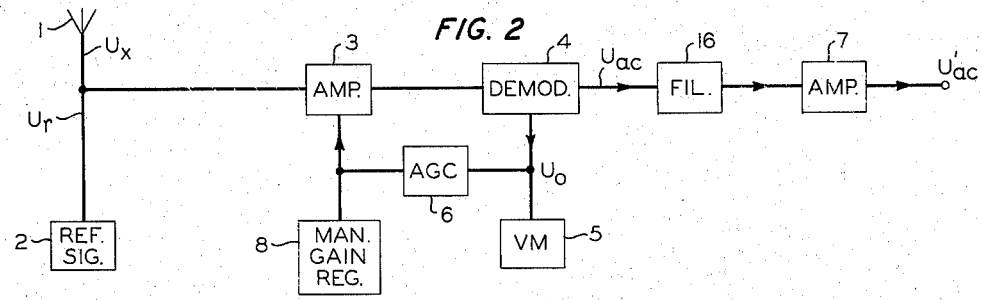
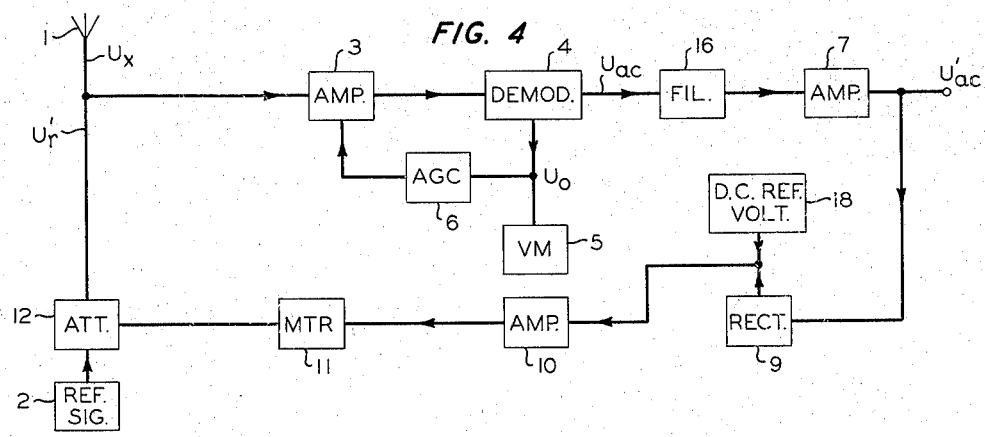
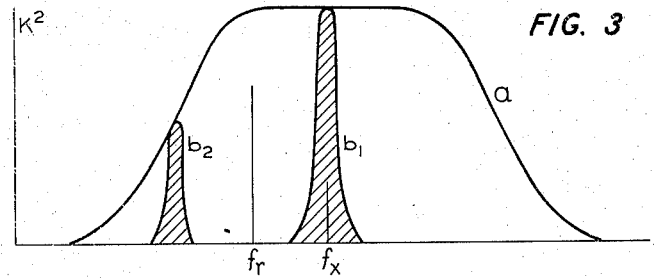
INVENTOR
JURIJ KARPINSKÝ
BY
ATTORNEY United States Patent Office 3,214,692
Patented Oct. 26, 1965

3,214,692
METHOD OF AND DEVICE FOR MEASURING SMALL ALTERNATING SIGNALS
Jurij Karpinský, Prague, Czechoslovakia, assignor to Ceskoslovenska Akademie Ved, Prague, Czechoslovakia
Filed Jan. 6, 1961, Ser. No. 81,173
Claims priority, application Czechoslovakia, Jan. 12, 1960, 222/60; Jan. 14, 1960, 278/60
7 Claims. (Cl. 325—363)

The present invention relates to a method of and a device for measuring weak alternating current signals.

Heretofore either specially built measuring receivers or good-quality communication receivers have been used for measuring high-frequency signals. For long-term measurements of the intensity field of radio waves emitted by a distant transmitter, communication receivers are mostly used, not only because high quality measuring receivers are in short supply and comparatively expensive, but sometimes also because of their limited sensitivity caused by the use of a mixer, usually of the diode-type, arranged directly on the receiver input.

Even in connection with specially designed measuring receivers (including field-intensity measuring instruments), which are built so as to possess as constant a gain as possible, it is essential to effect in relatively short intervals the calibration of the gain or its checking by means of a built-in source of signals having a known value. This provision is far more necessary when conventional communication receivers are used, which are designed for purposes where a constant gain is not essential.

Receivers which are connected as calibrated tuned micro-voltmeters operate either with an inoperative automatic gain control (hereinafter termed AGC) and with direct proportionality between the indication on the receiver output and the input voltage, or with an operative AGC and an approximately logarithmic relationship between the measured voltage of the AGC and the input voltage. An advantage of the linear operation—provided the preceding calibration has been effected correctly—is the relative accuracy of measurement, which, as a rule, cannot be attained with logarithmic operation, with a view to the relation between the regulation characteristic of the AGC and the actual characteristics of the electron tubes used. In linear operation with a constant gain it is, however, possible to achieve but a small dynamic range of measured signals, said range being given by the nonlinear characteristic of the demodulator.

The present invention aims to avoid the disadvantages of the heretofore used methods of measuring and particularly registering of faint radio signals, the main drawbacks of such methods being an inconstant gain necessitating periodic calibration, low accuracy in logarithmic operation and small dynamic range in linear operation, and in some cases even a too low selectivity of the receiver.

The measuring method according to the invention is advantageous in that the accuracy of measurement is in principle not dependent on variations of gain and that it affords the possibility of using such receivers whose frequency instability exceeds many times the width of the resulting band attained by the present invention.

The present invention can be applied with preference to field-intensity measuring instruments, tuned micro-voltmeters for laboratory purposes and measuring receivers. The invention offers particular advantages in connection with appliances intended for long-term measurements and recordation of the field-intensity of signals having constant frequencies.

The present invention relates to a method and a device for measuring weak, alternating, usually high-frequency signals, i.e. voltage or current, wherein a reference signal of a known and suitable value is supplied simultaneously with the measured signal to the input of a receiver having a sufficiently wide and flat selectivity curve (the value of the reference signal being usually far higher than that of the measured signal).

The frequencies of both signals differ but little, their values lying on the flat part of the selectivity curve, with the result that both signals are amplified to a substantially equal degree. The resulting signal is a beat, the envelope of which is varying with the difference frequency. By means of demodulation of this beat avoltage (or current) results which consists of a D.C. and an A.C. component. From the ratio of the values of the A.C. component (for example the amplitude of the 1st harmonic) to the D.C. component the proportionality of both input signal levels is determined. The D.C. component on the demodulator output in the respective device may be maintained preferably by an AGC circuit at a constant value independently of variations in the receiver gain, and if the signal to be measured is always smaller than the constant reference signal, then the A.C. component on the demodulator output is in an univocal relationship to the amplitude of the signal to be measured. For such signals, which are sufficiently small with respect to the reference signal, the two values are directly proportional.

The A.C. component on the demodulator output is preferably filtered through a narrow band filter. The reference signal is fixed, invariable as to time, or preferably adjusted by a servomechanism so as to follow with a suitable time constant the slow variations in the mean value of the signal, whereby a separate recordation of said mean value and rapid relative variations (fadings) of the signal is made possible. This is important for devices serving in experimental research in the field of propagation of radio waves.

The present invention will now be explained in detail with reference to the accompanying drawings.

FIGURE 1 illustrates the principle of the measuring method according to the invention.

FIGURE 2 shows, by way of example, a block diagram according to the invention, the constant value of the A.C. component of the demodulator output being achieved by AGC compensation.

FIGURE 3 illustrates the possibility of a post detector filtration of the difference frequency and the question of the resulting band width.

FIGURE 4 shows a device according to the invention serving for research in radio-waves propagation with separate recordation of the mean value of the signal and its rapid relative variations.

FIGURE 1 shows the resulting curve on the receiver input, said curve being produced by the addition of two high-frequency sinusoidal signals having near frequencies, i.e. a reference signal with the amplitude $U_r$ and a signal to be measured with an amplitude $U_x$. If $U_x$ is smaller than $U_r$, then the amplitude of the resulting waveform varies from the minimum value $U_r-U_x$ to the maximum value $U_r+U_x$. If $U_x$ compared with $U_r$ is sufficiently small, these variations are practically sinusoidal. The envelope of the resulting signal shows therefore a mean value (D.C. component) equal to $U_r$ and an A.C. (sinusoidal) component having the amplitude $U_x$. The case when $U_x$ is greater than $U_r$ is analogous, but less interesting from the practical point of view and this is why in the further disclosure the case when $U_x$ is smaller than $U_r$ will considered only.

If the receive gain is equal for both signals (irrespective of whether straight amplification or an amplification confined with a frequency conversion in the mixer of a superheterodyne receiver is concerned), there is, even after the amplification, the ratio of the amplitude of the A.C. component and the D.C. component of the envelope equal to $U_x/U_r$ and can be determined by measuring the D.C. component $U_o$ and the A.C. component $U_{ac}$ of the voltage on the output of the receiver demodulator which is preferably of the linear type with an equal efficiency of rectification for the carrier and the modulation (the A.C. and D.C. components). If the amplitude of the signal $U_x$ to be measured approaches the amplitude of the reference signal $U_r$, the wave form of the alternating component $U_{ac}$ on the demodulator is not sinusoidal any more. A deviation, if any, in the relationship between the measured value of said A.C. component and the input signal $U_x$ from proportionality depends on the manner in which the component $U_{ac}$ is measured (effective value, peak value, amplitude of 1st harmonics etc.) The correction, however, can be determined by calculation or measurement, if it is desirable to operate even with values of the signal to be measured $U_x$ close to those of the reference signal $U_r$.

FIGURE 2 shows an embodiment of a device for measuring or registering the field intensity according to the present invention. The device comprises an aerial 1 for picking up a signal to be measured $U_x$, a source 2 of a reference signal $U_r$, a unit 3 comprising either a high-frequency amplifier, a frequency converter and an intermediate-frequency amplifier of superheterodyne receiver, or a high-frequency amplifier of a straight receiver, further a linear demodulator 4 with outputs for the A.C. component $U_{ac}$ and D.C. component $U_o$, a D.C. current voltmeter 5 an AGC circuit 6, an A.C. amplifier 7, which is preferably designed as a selective amplifier, and a manually controlled gain regulator 8.

Assuming the reference signal $U_r$ to be sufficiently strong as compared with the maximum value of the signal to be measured $U_x$, then the D.C. component $U_o$ on the demodulator output will be independent on the magnitude of the signal $U_x$. The value $U_o$ is measured with the D.C. voltmeter 5. Due to the action of the AGC circuit 6 the value $U_o$ is stabilized and is little dependent on the variations in temperature, feeding voltages, ageing of the electron tubes and the like. Its exact (nominal) value can, moreover, be adjusted with the hand-operated gain regulator 8 according to the indications on the voltmeter 5.

The A.C. voltage $U_{ac}$ from the demodulator 4 is amplified by the A.C. amplifier 7 with a defined gain value. The amplified voltage $U_{ac}'$, which for constant values of the reference voltage $U_r$ and of the D.C. component $U_o$ is proportional to the unknown input voltage $U_x$, is measured or recorded with a suitable instrument. If the recordation is effected by a sufficiently sensitive instrument such as the conventional level recorder used in acoustics, the amplifier 7 may be omitted from the device shown in FIG. 2.

If particularly high requirements are placed on a long term stability of the device, it is necessary to secure also a perfect stability of the D.C. component $U_o$, which cannot be achieved by the conventional type of the AGC circuit 6. This stability can however be achieved in a simple way by means which are currently used in regulation system, in particular by compensating the larger part of the D.C. component $U_o$ by a fixed reference voltage, by the use of a D.C. amplifier in the AGC-circuit 6, by the use of regulation with an integrating member (motor with potentiometer) and the like.

FIGURE 3 shows the resulting selectivity curve of the entire system illustrated in FIGURE 2, when the amplifier 7 is a selective amplifier with maximum gain for the beat frequency which has a far narrower band than the receiver 3. Frequencies are plotted along the abscissae and the power gain $K^2$ along the ordinates. The curve $a$ represents the frequency characteristic of the block 3. The reference signal having a frequency $f_r$ as well as the signal to be measured having a frequency $f_x$ are amplified to the same degree. Curves $b_1$, $b_2$ represent the resulting selectivity curve measured on the output of the amplifier 7. In addition to the direct channel $b_1$ an image channel $b_2$ is also produced, which can partly be suppressed.

If the stability of both frequencies $f_x$ and $f_r$ is satisfactory, as it is for instance when measuring the field intensity of broadcasting transmitters and applying a crystal oscillator as source 2 of the reference signal, the band of the amplifier 7 may be chosen far narrower than the technically obtainable band width in a receiver 3 of a conventional design. In this way the noise and interference by other signals during the measuring operation can considerably be reduced even if the image channel cannot effectively be suppressed; the requirements placed on the band width and stability of the receiver (i.e. block 3) are exceedingly small.

It follows from the disclosed embodiment that the method according to the invention places very modest requirements on the frequency stability, selectively and gain stability of the receiver 3, which therefore can be designed in a cheap and simple way. It is a further advantage that in some applications, when the signal to be measured need not be identified (small-size field meausring instruments for a single purpose and the like) it is possible to use a very strong signal $U_r$ (such as a signal exceeding $U_x$ by 60 db), which suffices to excite the demodulator 4 to the linear part with a relatively small gain of the high-frequency and intermediate frequency of receiver 3. The weak A.C. signal at the output of the demodulator 4 can then be amplified by means of the amplifier 7 to the required level. This transfer of a part of the gain to the low frequency (preferably narrow-band) is advantageous, in particular in connection with transistor technique.

An immediate effect in using the demodulator 4 as an additive mixer is its linearity with respect to the signal to be measured and the large dynamic range of measured signals following therefrom and unobtainable in conventional receivers with a constant gain. When measuring or recording the output voltage $U_{ac}'$ with an instrument provided with a logarithmic scale (preferably a level recorder) it is possible to record without any distortion levels differing by 60 db and more. When measuring the amplified output voltage $U_{ac}'$ with an instrument provided with a linear scale (such as a moving coil with a rectifier instrument) the range of the entire device shown in FIGURE 2 can preferably be changed by means of a range changing switch inserted in the circuit of the A.C. amplifier 7.

The range can also be varied by a defined change in the reference signal $U_r$.

The device as shown in FIGURE 4 is a modification of the device in FIG. 2 and is intended for automatic recordation of signals varying within a wide range of levels.

The aerial 1, the reference signal source 2, the unit 3 comprising the high-frequency amplifier, the frequency converter and intermediate frequency amplifier of the superheterodyne or merely the amplifier of the straight receiver, the linear demodulator 4 with outputs for the A.C. component $U_{ac}$ and the D.C. component $U_o$, the direct current voltmeter 5, the AGC circuit 6 and the amplifier 7 are analogous to those as used in the device according to FIGURE 2. The amended device illustrated in FIG. 4 includes further a rectifier 9, a source 18 of a D.C. reference voltage, a power amplifier 10 of the difference signal, a motor 11 driving the attenuator 12 operating with a continuously variable attenuation.

The signal to be measured $U_x$ and the reference signal $U_r'$ produced by attenuating the constant signal $U_r$ from the reference signal source 2 with the aid of the attenuator 12 are fed simultaneously to the input of receiver 3. Both signals, their propinquity of frequency having been explained with reference to FIG. 3, considerably stronger than $U_x$ are amplified by the block 3 in the same degree and feed to the demodulator 4; the D.C. component $U_o$ is maintained by the AGC circuit 6 permanently at a constant value and, if required, checked by the voltmeter 5.

The A.C. component $U_{ac}$, which is proportional to the ratio $U_x/U_r'$, is amplified by the amplifier 7 (preferably a frequency selective amplifier) and rectified by the rectifier 9, whose output voltage is permanently being compared with the D.C. reference voltage from the source 18.

The difference $\Delta$ of both voltages controls over the amplifier 10 and motor 11 the attenuation of the attenuator 12 so as to balance the value of the demodulator output voltage $U_{ac}$ to a constant (nominal) value. Therefore the ratio $U_x/U_r'$ in the steady state has also a constant value and during slow variations of the signal $U_x$ the voltage $U_r'$ (and thus the recordable position of the control element of the attenuator 12) follows the variations of the signal $U_x$ to be measured.

If desired that the disclosed device separates quick fadings from slow variations in the mean level of the signal, it is necessary to choose the gear ratio between the motor 11 and the control element varying the attenuation effect of the attenuator 12 in such a manner that the motor 11 should be incapable to noticeably change the attenuation effect of the attenuator 12 during one fading. If the motor 11 is of the integrating type, the amplifier 10 of the linear type and the attenuator 12 shows a linear dependence of the attenuation in decibels upon the shift of the control element (preferably a so-called cut-off attenuator) then the speed of the variation in the level of $U_r'$ expressed in decibels per second is proportional to the momentary deviation $\Delta$ of voltage at the output of the rectifier 9 from the reference A.C. voltage of the source 18. With equal speed the variations take place in the gain of the entire device for the measured signal $U_x$ defined for instance as the ratio $Z_{ac}'/U_x$, wherein $U_{ac}'$ is the A.C. voltage on the output of the amplifier 7.

According to the type of the rectifier 9 used (linear or square law i.e. with D.C. output proportional to the power of the supplied signal) the system searates the relative quick changes in the voltage or power of the signal from the slowly varying mean value. Rapid relative changes can be measured and recorded on the output of the rectifier 9 or output of the amplifier 7, while slow variations in the mean level of the signal can be determined from the recorded position of the control element of the attenuator 12.

The described device, while retaining the advantages of known devices with controlled attenuator in the signal channel has the additional advantage that the attenuator with controlled attenuation is not a part of the receiver so that for this use any communication or even broadcast receiver of a sufficient sensitivity can easily be adapted; further that no periodic calibration of the apparatus is necessary and that the requirements placed on the frequency stability of the receiver are reduced, while at the same time a narrowing of the resulting band width is possible.

If the attenuator is required to immediately follow the variations in the input signal, then the speed of rotation of the motor 11 need not be proportional to the deviation $\Delta$. In such a case an on-off control of the motor 11 will be found sufficient. Instead of the motor 11 a moving coil or other system can in this case be applied, if needed, said system generating a force or a moment proportionate to the deviation $\Delta$ which puts the attenuator and thereby the whole system in substantially balanced state.

Having shown and described specific embodiments of my invention to illustrate the application of the principles thereof, it will be understood that my invention can be differently embodied without departing from the explained principles.

I claim:

1. A method for measuring weak alternating signals by means of a wireless receiver having a sufficiently wide and flat selectivity curve, comprising the steps of coupling to the input of the receiver simultaneously the signal to be measured and a reference signal of a known level and of so near a frequency that both signals are within the flat part of the selectivity curve of the receiver, and measuring the ratio of the A.C. and D.C. component of the output signal of the demodulator of the receiver.

2. A method according to claim 1, comprising holding the level of the reference signal in the course of measurement on a constant value, holding the D.C. component of the output signal of the demodulator of the receiver on a constant value and using the A.C. component of the said output signal of the demodulator as a measure for the signal to be measured in a known scale dependent from the reference signal and the D.C. component of the demodulator output signal.

3. A method according to claim 1, comprising holding automatically the D.C. component of the output signal of the demodulator on a constant value, controlling automatically the level of the reference signal so as to hold the A.C. component on the output signal of the demodulator on a constant value, and using the value of the reference signal as a measure of the value of the signal to be measured in a known scale dependent from the stabilized values of the A.C. and D.C. components on the said demodulator output signal.

4. A method according to claim 1, comprising holding automatically the D.C. component of the demodulator output signal on a constant value, controlling automatically the level of the reference signal so as to hold the A.C. component of the output signal of the demodulator in a steady state on a constant value, this state being approached with a time constant adjustable in reference to the expected speed of fading of the signal to be measured, using the value of the reference signal as a measure of the mean value of the signal to be measured, in a known scale dependent from the stabilized value of the D.C. component of the output signal of the demodulator and the stabilized mean value of the A.C. component of said signal and using the ratio of the instantaneous value of the said signal to the said stabilized mean value of the same signal as a measure of the relative variation of the signal to be measured.

5. A device for measuring weak alternating signals comprising a wireless receiver having a sufficiently wide and flat selectivity curve and including a demodulator and a AGC circuit, a source of the signals to be measured, a reference signal source of a known signal level and so near a frequency that both signals are within the flat part of the selectivity curve of the receiver, both signal sources being coupled to the receiver input, and means for measuring the D.C. and A.C. component of the output signal of the demodulator.

6. A device for measuring weak alternating signals comprising a wireless receiver having a sufficiently wide and flat selectivity curve and including a demodulator and an AGC circuit; a source of the signal to be measured; a reference signal source of a constant signal level and of so near a frequency that both signals are within the flat part of the selectivity curve of the receiver; both signal sources being coupled simultaneously to the receiver input; an attenuator interposed between the reference signal source and the receiver input; circuits for automatic control of said attenuator adapted to stabilize the A.C. component of the output signal of the demodulator at a predetermined value; and means for recording the position of said attenuator as a measure of the signal to be measured.

7. A device for measuring weak alternating signals comprising a wireless receiver having a sufficiently wide and flat selectivity curve and including a demodulator and an AGC circuit adapted to permanently maintain the value of the D.C. component of the output signal of the demodulator within limits given by the required accuracy of measurement; a source of the signal to be measured; a reference signal source of a constant signal level and of so near a frequency that both signals are within the flat part of the selectivity curve of the receiver; both signal sources coupled to the receiver input; an attenuator interposed between the reference signal source and the receiver input; circuits for deriving a difference signal proportional to the difference between the instantaneous value of the A.C. component of the output signal of the demodulator and a given nominal value of this component; an electromechanical actuator controlling the position of the attenuator with a speed proportional to the said difference signal, the constant of this proportionality being chosen so that the change in the position of the attenuator is negligible during the individual fast fadings of the signal to be measured; means for measuring and recording the value of the A.C. component of the output signal of the demodulator; and means for indicating and recording the position of the attenuator of the reference signal.

References Cited by the Examiner

UNITED STATES PATENTS 2,295,629  9/42  Bond _____ 250—1

OTHER REFERENCES

Department of the Army Technical Manual, C-W and A.M. Radio transmitters and Receivers, 1952; p. 198.

ROBERT H. ROSE, *Primary Examiner.*

GEORGE N. WESTBY, DAVID G. REDINBAUGH,
*Examiners.*